United States Patent [19]
Geon

[11] Patent Number: 5,873,803
[45] Date of Patent: Feb. 23, 1999

[54] SETTING THE LINE PRESSURE AS A FUNCTION OF A PREDETERMINED RATIO AND POWER-ON STATE DUTY RATIOS DURING A POWER-OFF

[75] Inventor: Byung-Wook Geon, Kyunggi-do, Rep. of Korea

[73] Assignee: Hyundai Motor Co., Ltd., Seoul, Rep. of Korea

[21] Appl. No.: 773,935

[22] Filed: Dec. 30, 1996

[30] Foreign Application Priority Data

Dec. 30, 1995 [KR] Rep. of Korea .................. 1995-69121

[51] Int. Cl.$^6$ ............................ F16H 61/00; B60K 41/08
[52] U.S. Cl. ......................... 477/158; 477/156; 477/160; 477/161
[58] Field of Search ...................... 475/143, 155, 475/156, 158, 159, 160, 161, 120

[56] References Cited

U.S. PATENT DOCUMENTS

| | | | |
|---|---|---|---|
| 4,846,021 | 7/1989 | Hamano et al. ..................... | 477/158 X |
| 4,922,424 | 5/1990 | Hiramatsu ........................... | 477/155 X |
| 4,955,259 | 9/1990 | Narita .................................. | 477/161 |
| 5,003,842 | 4/1991 | Hatta et al. .......................... | 477/143 X |
| 5,086,668 | 2/1992 | Fujiwara et al. .................... | 477/158 X |
| 5,115,695 | 5/1992 | Wakahara et al. .................. | 477/161 |
| 5,303,614 | 4/1994 | Sasaki et al. ........................ | 477/158 |
| 5,540,635 | 7/1996 | Jang ..................................... | 477/135 |
| 5,573,476 | 11/1996 | Minowa et al. ..................... | 477/159 X |

Primary Examiner—Khoi Q. Ta

[57] ABSTRACT

The method of controlling a pressure control solenoid valve which controls hydraulic pressure in a hydraulic control system for an automatic transmission of a vehicle first senses a plurality of vehicle operating conditions, and detects a power-on vehicle operating state based on the sensed vehicle operating conditions. Next, the method controls a duty ratio of the pressure control solenoid valve according to predetermined values corresponding to the power-on state when the power-on state detected. The method then detects a change in the vehicle operating state from the power-on state to a power-off state. Upon detection, the method generates an initial duty ratio for the pressure control solenoid valve based on a predetermined duty ratio corresponding to the power-off state and duty ratios supplied to the pressure control solenoid valve during the power-on state. The pressure control solenoid valve is then controlled according to this initial duty ratio during the power-off state.

4 Claims, 5 Drawing Sheets

SETTING THE LINE PRESSURE AS A FUNCTION OF A PREDETERMINED RATIO AND POWER-ON STATE DUTY RATIOS DURING A POWER-OFF

BACKGROUND OF THE INVENTION

1. Field of the Invention

The present invention relates to a hydraulic pressure control method of a four-speed automatic transmission. More particularly, it relates to a hydraulic pressure control method when an upshift operation changes from a power-on upshift to a power-off upshift.

2. Discussion of Related Art

Automatic transmissions for vehicles selectively actuate a plurality of friction elements such as clutches and brakes, forming part of the automatic transmission, using a hydraulic control system to obtain different gear ratios. FIG. 1 is a representative example of such a hydraulic control system. U.S. Pat. No. 5,003,842 and 5,540,635 to Hatta et al. and Jang, respectively, both hereby incorporated by reference, disclose other examples.

Because the operation of such conventional hydraulic control systems is so well known and readily ascertainable from the above cited patents, a description of that operation will not be repeated for the sake of brevity. During operation a pressure control solenoid valve 2 controls the line pressure in the hydraulic control system in accordance with duty ratios generated by a transmission control unit (TCU) 4. The TCU 4 typically includes a central processing unit, a read only memory, and a random access memory, The TCU 4 controls the operation of the hydraulic control system based on vehicle operating conditions. A plurality of sensors, such as a vehicle speed sensor, engine speed sensor, load or throttle valve sensor, etc, connected to the TCU 4 convey the vehicle operating conditions.

During operation, if a driver depresses the accelerator pedal, placing a large load on the engine, the automatic transmission enters a power-on state. If the accelerator pedal is then released, the automatic transmission enters a power-off state. FIG. 2A illustrates the duty ratio applied to the pressure control solenoid valve 2 by the TCU 4 (see FIG. 1) of the hydraulic control system when the automatic transmission enters the power-on state and then switches to the power-off state. FIG. 2B illustrates the speed of the turbine of the automatic transmission's torque converter when the pressure control solenoid valve 2 operates according to the duty ratio of FIG. 2A.

FIG. 3 illustrates the flow chart of the control method implemented by the TCU 4 during power-on control. In step S2, the TCU 4 outputs duty ratios according to predetermined duty ratios stored therein. As shown in FIG. 2A, at the beginning of the power-on state SS, a minimum duty ratio is output for a first predetermined period of time. Once the first predetermined period of time expires, the duty ratio is set at a first predetermined value, greater than the minimum duty ratio, for a second predetermined period of time. After expiration of the second predetermined period of time, the TCU 4 sets the duty ratio to a second predetermined value, greater than the first predetermined value, for a third predetermined period of time. After the third predetermined period expires, the duty ratio is set to a third predetermined value which is greater than the second predetermined value.

Processing then proceeds to step S4 where the TCU 4 performs conventional duty ratio control such as disclosed in U.S. Pat. No. 5,086,668 to Fujiwara et al., hereby incorporated by reference, using the third predetermined value as an initial value.

Next, in step S6, the TCU 4 determines whether control of the automatic transmission should switch to the power-off state. If not, conventional duty ratio control continues. If control of the automatic transmission switches to the power-off state, then in step S8, the TCU 4 outputs an initial power-off duty ratio $D_{off}$ to the pressure control solenoid valve 2.

Afterwards, in step S10, the TCU 4 preforms conventional duty ratio control using the initial power-off duty ratio $D_{off}$ as an initial value.

As a result of switching from the power-on state to the power-off state, a "Run-Up" phenomenon occurs wherein as shown in FIG. 2B the revolutions per minute (hereinafter referred to as a RPM) of the turbine significantly increases and then lowers. The increase is caused by the decrease in the load place on the engine as a result of decreasing the line pressure in the hydraulic control system because the initial power-off duty ratio is much higher then the previously output duty ratio. As shown in FIG. 4, duty ratio is inversely proportional to line pressure.

SUMMARY OF THE INVENTION

Accordingly, the present invention is directed to a hydraulic pressure control method according to a power state during up-shift of automatic transmission that substantially obviates one or more of the problems due to limitations and disadvantages of the prior art.

These and other objective are achieved by providing a method of controlling a pressure control solenoid valve which controls hydraulic pressure in a hydraulic control system for an automatic transmission of a vehicle, comprising: (a) sensing a plurality of vehicle operating conditions; (b) detecting a power-on vehicle operating state based on said sensed vehicle operating conditions; (c) controlling a duty ratio of said pressure control solenoid valve according to predetermined values corresponding to said power-on state when said step (b) detects said power-on state; (d) detecting a change in vehicle operating state from said power-on state to a power-off state; (e) generating an initial duty ratio for said pressure control solenoid valve based on a predetermined duty ratio corresponding to said power-off state and duty ratios supplied to said pressure control solenoid valve during said power-on state; and (f) controlling said duty ratio of said pressure control solenoid valve during said power-off state based on said initial duty ratio when step (d) detects said change in vehicle operating state form said power-on state to said power-off state.

These and other objectives are further achieved by providing an apparatus for controlling a pressure control solenoid valve which controls hydraulic pressure in a hydraulic control system for an automatic transmission of a vehicle, comprising: sensing means for sensing a plurality of vehicle operating conditions; first detecting means for detecting a power-on vehicle operating state based on said sensed vehicle operating conditions; second detecting means for detecting a change in vehicle operating state from said power-on state to a power-off state; control means for controlling a duty ratio of said pressure control solenoid valve according to predetermined values corresponding to said power-on state when said first detecting means detects said power-on state, for generating an initial duty ratio for said pressure control solenoid valve based on a predetermined duty ratio corresponding to said power-off state and duty ratios supplied to said pressure control solenoid valve during said power-on state, and for controlling said duty ratio of said pressure control solenoid valve during said power-off state based on said initial duty ratio when said second detecting means detects said change in vehicle operating state from said power-on state to power-off state.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE ATTACHED DRAWINGS

The accompanying drawings, which are intended to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENTS

Figure 1:
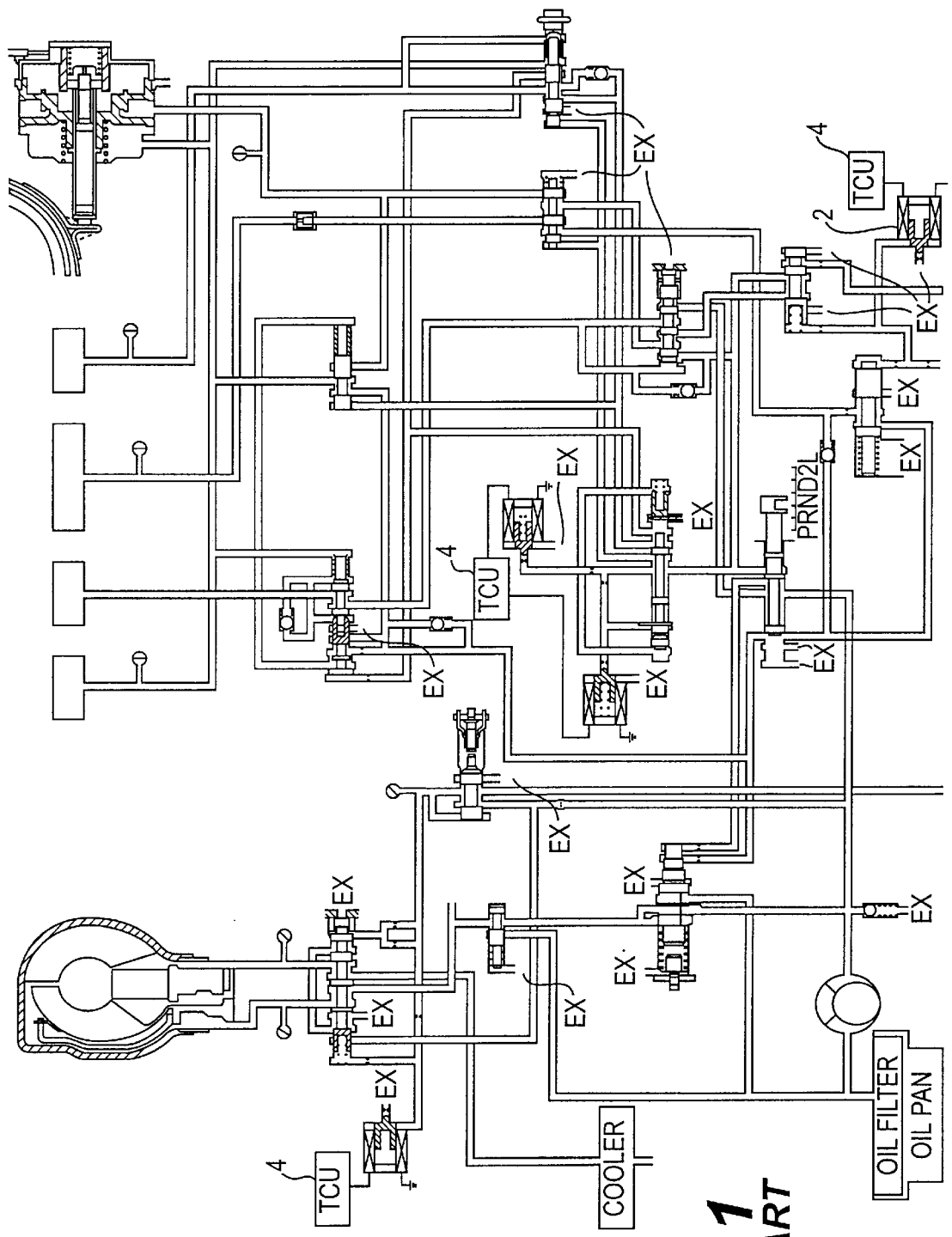
FIG. 1 is a hydraulic pressure circuit diagram of four-speed automatic transmission in accordance with a preferred embodiment of the present invention.
Figure 2A:
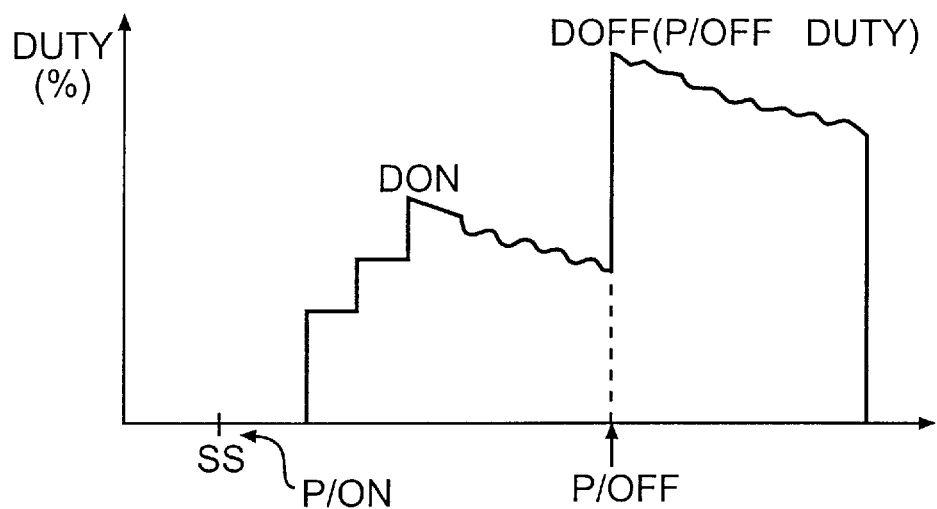
FIGS. 2A–2B show duty ratios generated from a power-on state to a power-off state and turbine rotating speeds, respectively, according to the conventional art.
Figure 2B:
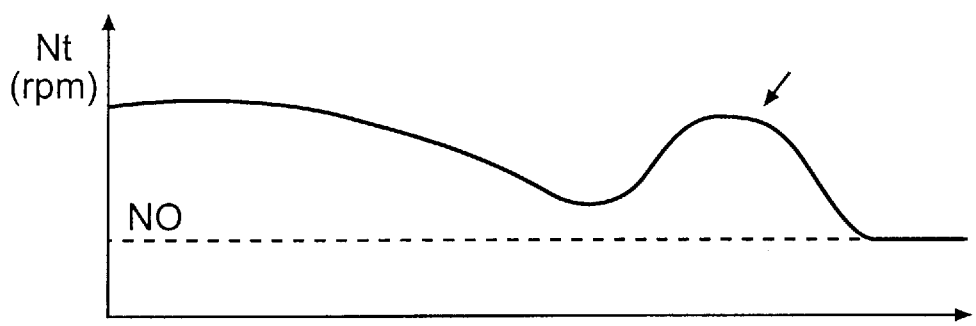
Figure 3:
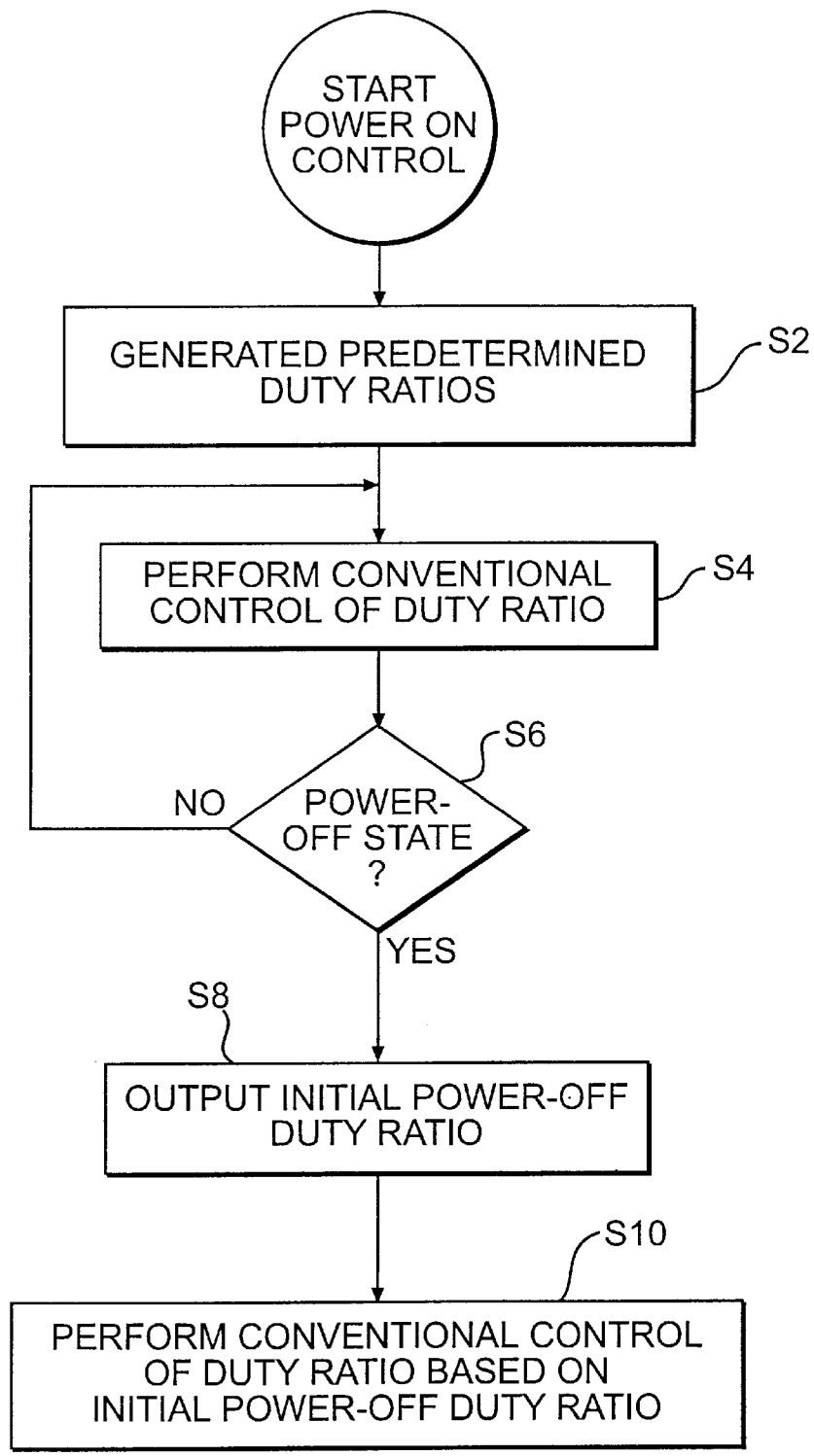
FIG. 3 illustrates the flow chart of the conventional control method implemented by a TCU during power-on control.
Figure 4:
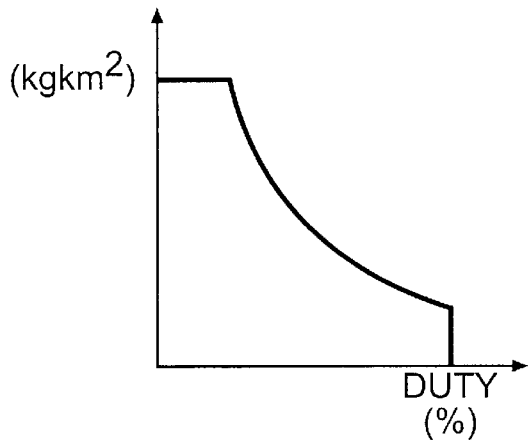
FIG. 4 is a map showing a relationship between duty ratios and hydraulic pressure.
Figure 6A:
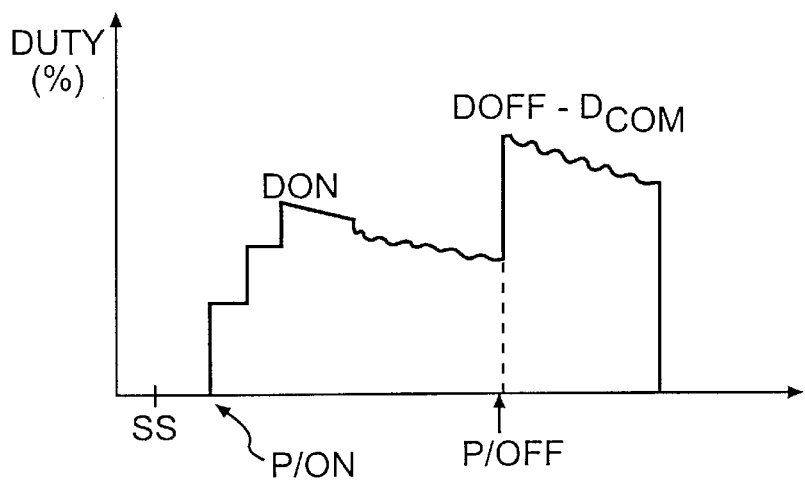
FIGS. 6A–6B show duty ratios generated from a power-on state to a power-off state according to the control method of FIG. 5.
Figure 6B:
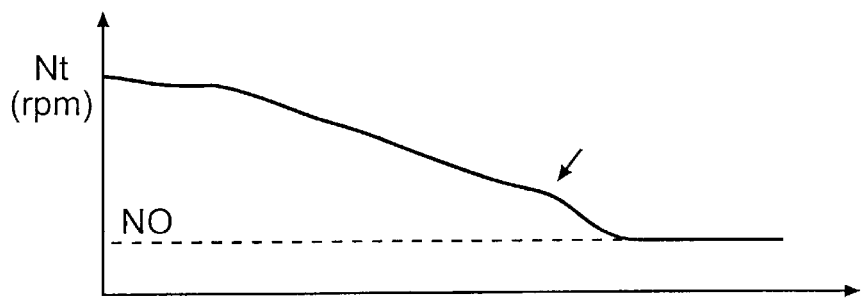
Figure 5:
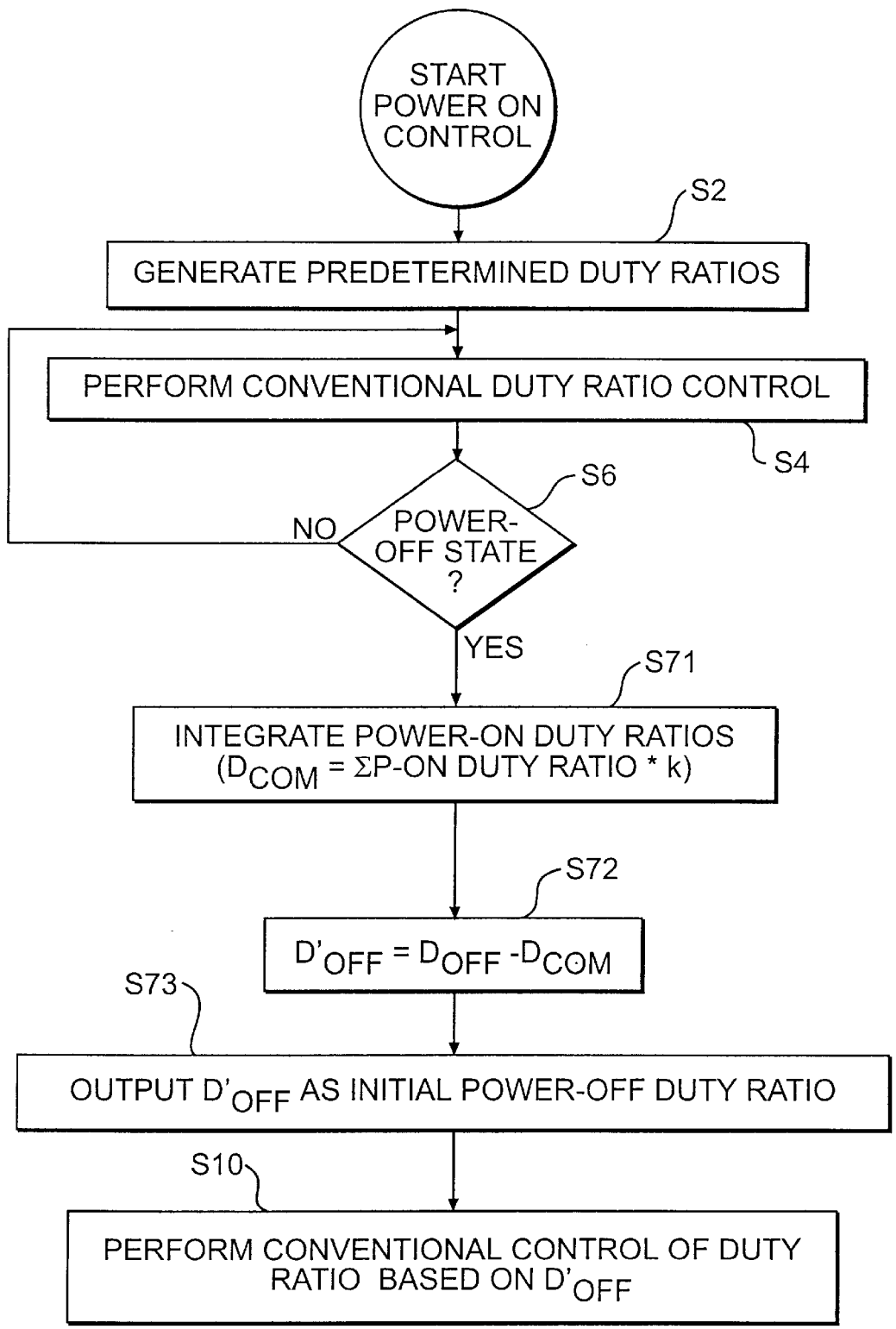
FIG. 5 illustrates the flow chart of the control method according to the present invention implemented by a TCU during power-on control.

Reference will now be made in detail to the preferred embodiment of the present invention, examples of which are illustrated in the accompanying drawings. FIG. 5 illustrates the flow chart of the control method according to the present invention implemented by the TCU 4 during power-on control. Steps S2, S4, and S6 are performed in the same manner as discussed above with respect to FIG. 3. If control of the automatic transmission switches to the power-off state, however, processing proceeds from step S6 to step S71.

In Step S71, the TCU integrates the duty ratios generated during the power-on state, and multiplies the integration duty ratio by a predetermined coefficient K. As will be readily appreciated by one skilled in the art from this disclosure, the predetermined coefficient K is selected according to desired operating characteristics of the automatic transmission. Next, in step S72, the TCU 4 subtracts the integration duty ratio $D_{COM}$ from the initial power-off duty ratio $D_{off}$ to generate a new initial power-off initial duty ratio $D'_{off}$.

Then, in step S73, the TCU 4 outputs the new initial power-off duty ratio $D'_{off}$ to the pressure control solenoid valve 2. Afterwards, in step S10, the TCU 4 preforms conventional duty ratio control using the new initial power-off duty ratio as an initial value $D'_{off}$.

As a result of correcting the initial power-off duty ratio, the Run-Up phenomenon is largely eliminated.

It will be apparent to those skilled in the art that various modifications and variations can be made in a hydraulic pressure control method according to a power state during up-shift of automatic transmission of the present invention without departing from the spirit or scope of the invention. Thus, it is intended that this present invention cover the modifications and variations of this invention provided they come within the scope of the appended claims and their equivalents.

What is claimed is:

1. A method of controlling a pressure control solenoid valve which controls hydraulic pressure in a hydraulic control system for an automatic transmission of a vehicle, comprising:

(a) sensing a plurality of vehicle operating conditions;

(b) detecting a power-on vehicle operating state based on said sensed vehicle operating conditions;

(c) controlling a duty ratio of said pressure control solenoid valve according to predetermined values corresponding to said power-on state when said step (b) detects said power-on state;

(d) detecting a change in vehicle operating state from said power-on state to a power-off state;

(e) generating an initial duty ratio for said pressure control solenoid valve based on a predetermined duty ratio corresponding to said power-off state and duty ratios supplied to said pressure control solenoid valve during said power-on state; and (f) controlling said duty ratio of said pressure control solenoid valve during said power-off state based on said initial duty ratio when step (d) detects said change in vehicle operating state from said power-on state to said power-off state.

2. The method of claim 1, wherein said step (e) comprises:

(e1) integrating said duty ratios supplied to said pressure control solenoid value during said power-on state to generate an integration duty ratio; and (e2) subtracting said integration duty ratio from said predetermined duty ratio corresponding to said power-off state to generate said initial duty ratio.

3. An apparatus for controlling a pressure control solenoid valve which controls hydraulic pressure in a hydraulic control system for an automatic transmission of a vehicle, comprising:

sensing means for sensing a plurality of vehicle operating conditions;

first detecting means for detecting a power-on vehicle operating state based on said sensed vehicle operating conditions;

second detecting means for detecting a change in vehicle operating state from said power-on state to a power-off state;

control means for controlling a duty ratio of said pressure control solenoid valve according to predetermined values corresponding to said power-on state when said first detecting means detects said power-on state, for generating an initial duty ratio for said pressure control solenoid valve based on a predetermined duty ratio corresponding to said power-off state and duty ratios supplied to said pressure control solenoid valve during said power-on state, and for controlling said duty ratio of said pressure control solenoid valve during said power-off state based on said initial duty ratio when said second detecting means detects said change in vehicle operating state from said power-on state to power-off state.

4. The apparatus of claim 3, wherein said control means integrates said duty ratios supplied to said pressure control solenoid value during said power-on state to generate an integration duty ratio, and subtracts said integration duty ratio from said predetermined duty ratio corresponding to said power-off state to generate said initial duty ratio.

\* \* \* \* \*